United States Patent
Ogawa et al.

(10) Patent No.: US 6,463,906 B2
(45) Date of Patent: Oct. 15, 2002

(54) FUEL INJECTION CONTROL SYSTEM FOR INTERNAL COMBUSTION ENGINE

(75) Inventors: Ken Ogawa; Isao Komoriya; Kazuhiro Ueda, all of Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/816,238

(22) Filed: Mar. 26, 2001

(65) Prior Publication Data

US 2001/0025620 A1 Oct. 4, 2001

(30) Foreign Application Priority Data

Mar. 31, 2000 (JP) ........................................ 2000/098622

(51) Int. Cl.$^7$ .............................................. F02D 41/40
(52) U.S. Cl. ..................................... 123/295; 123/305
(58) Field of Search .................................. 123/295, 305

(56) References Cited

U.S. PATENT DOCUMENTS 5,797,367 A * 8/1998 Iida et al. ................... 123/295
6,062,191 A * 5/2000 Ooba .......................... 123/295

* cited by examiner

Primary Examiner—Andrew M. Dolinar
(74) Attorney, Agent, or Firm—Arent Fox Kintner Plotkin & Kahn, PLLC

(57) ABSTRACT

There is disclosed a fuel injection control system for an internal combustion engine, which is capable of properly determining fuel injection timing such that the fuel injection timing reflects behaviors of injected fuel, thereby improving drivability and fuel economy. The internal combustion engine of an in-cylinder fuel injection type is operated while switching between a stratified combustion mode in which fuel injection into each cylinder is performed during a compression stroke and a homogenous combustion mode in which the fuel injection into the cylinder is performed during an intake stroke. The fuel injection control system controls fuel injection timing. A required fuel injection time is determined based on detected operating conditions of the engine. A direct ratio and a carry-off ratio are determined based on the operating conditions of the engine. The required fuel injection time is corrected by using the direct ratio and the carry-off ratio, whereby a final fuel injection time period is determined. Based on the engine rotational speed and the final fuel injection time period, the fuel injection timing is determined.

6 Claims, 11 Drawing Sheets

F I G. 1 1
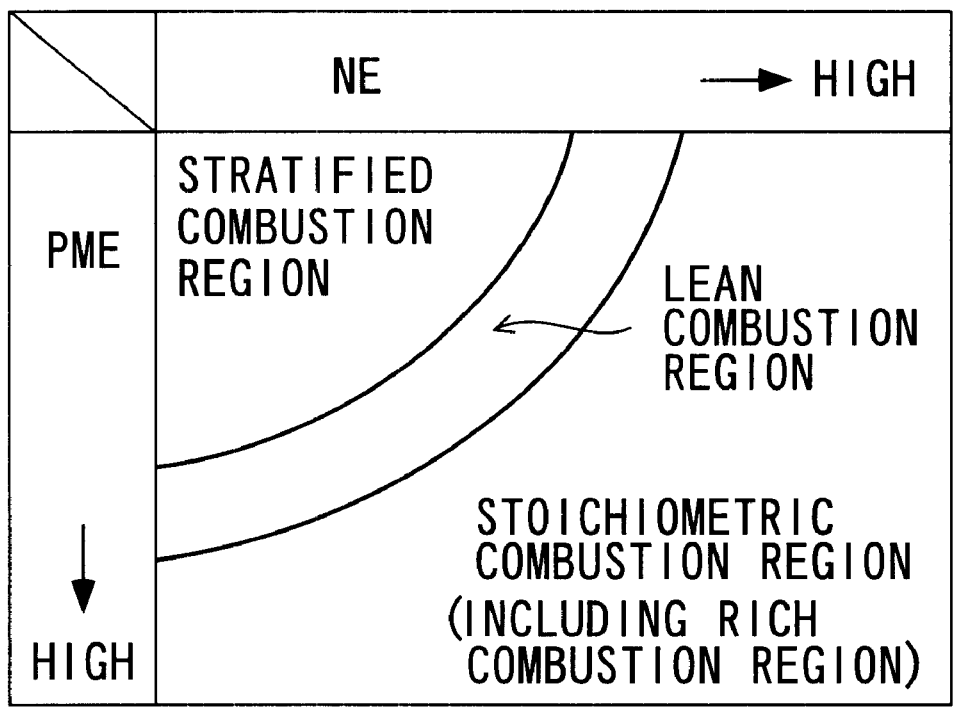

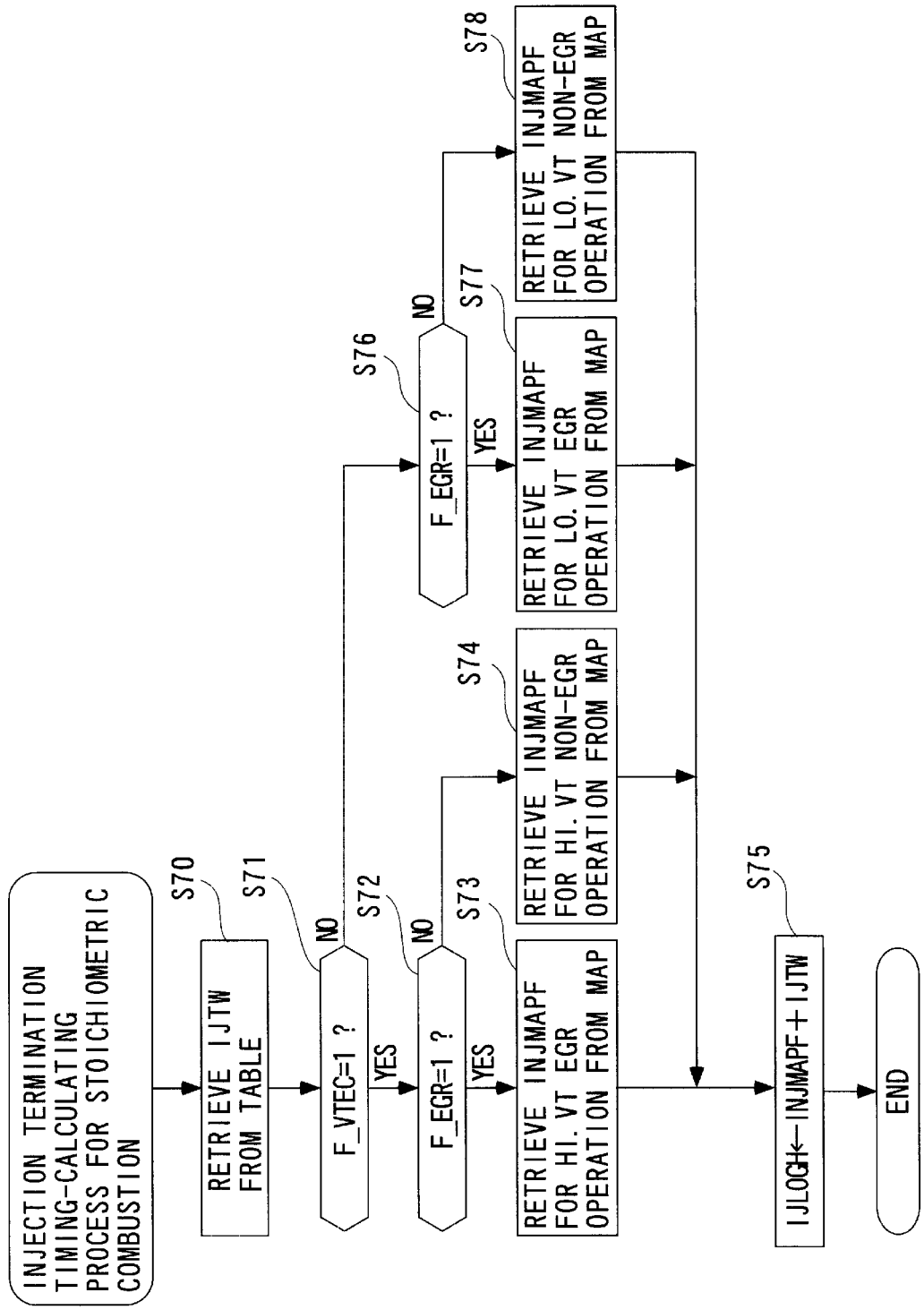

FUEL INJECTION CONTROL SYSTEM FOR INTERNAL COMBUSTION ENGINE

BACKGROUND OF THE INVENTION

1. Field of the Invention

This invention relates to a fuel injection control system for an internal combustion engine of an in-cylinder fuel injection type which is operated while switching between a stratified combustion mode in which fuel injection into each cylinder is performed during a compression stroke and a homogenous combustion mode in which the same is performed during an intake stroke, the fuel injection control system controlling the timing of the fuel injection.

2. Description of the Prior Art

Conventionally, a fuel injection control system of the above-mentioned kind has been proposed e.g. by Japanese Laid-Open Patent Publication (Kokai) No. 8-42381. In this fuel injection control system, fuel injection timing in the stratified combustion mode is calculated as follows: First, based on fuel pressure and a required fuel amount, a valve opening time period (fuel injection time period) is determined over which a fuel injection valve is required to be opened for injecting the required amount of fuel. Then, termination timing of the fuel injection timing is determined such that the fuel injection is terminated during a compression stroke. Based on the termination timing and the fuel injection time period, start timing of the fuel injection timing is calculated. Further, a correction term is calculated based on an engine coolant temperature, an engine rotational speed, and an engine load, and the correction term is added to the fuel injection timing to thereby determine a final fuel injection timing.

In general, in the in-cylinder fuel injection combustion engine, fuel is directly injected into a combustion chamber, and therefore, to obtain a desired engine output, it is required to accurately control not only the fuel injection time period but also the fuel injection timing. To this end, the conventional fuel injection control system calculates the fuel injection time period based on the fuel pressure and the required fuel amount, and corrects the fuel injection timing determined from the fuel injection time period by using the correction term determined depending on the engine coolant temperature, the engine rotational speed, and the engine load. In the calculation of the fuel injection time period, however, in order to compensate for influence of a dynamic behavior of fuel, such as deposition of fuel, and influence of purge of evaporative fuel, it is desirable to correct the fuel injection time period by using parameters indicative of such behaviors of fuel. On the other hand, when such a correction of the fuel injection time period is carried out, the conventional fuel injection control system cannot properly calculate the fuel injection timing since the correction thereof dependent on the above-mentioned parameters is not carried out. This can degrade drivability due to lowered engine output, as well as fuel economy.

SUMMARY OF THE INVENTION

It is an object of the invention to provide a fuel injection control system for an internal combustion engine, which is capable of properly determining fuel injection timing such that the fuel injection timing reflects the behaviors of injected fuel, thereby enabling improvement of drivability and fuel economy.

To attain the above object, according to a first aspect of the invention, there is provided a fuel injection control system for an internal combustion engine of an in-cylinder fuel injection type which is operated while switching between a stratified combustion mode in which fuel injection into each cylinder is performed during a compression stroke and a homogenous combustion mode in which the fuel injection into the cylinder is performed during an intake stroke, the fuel injection control system controlling timing of the fuel injection.

The fuel injection control system according to the invention is characterized by comprising:

operating condition-detecting means for detecting operating conditions of the engine;

required fuel amount-determining means for determining a required fuel amount based on the detected operating conditions of the engine;

parameter-calculating means for calculating parameters indicative of behaviors of the fuel based on the detected operating conditions of the engine;

fuel injection amount-determining means for determining a final fuel injection amount by correcting the required fuel amount by using the calculated parameters;

engine rotational speed-detecting means for detecting an engine rotational speed of the engine; and fuel injection timing-determining means for determining the fuel injection timing based on the detected engine rotational speed and the determined final fuel injection amount.

According to this fuel injection control system for an internal combustion engine, the required fuel amount is determined based on operating conditions of the engine, and a final fuel injection amount is determined by correcting the required fuel amount by using parameters indicative of behaviors of the fuel. Then, based on the final fuel injection amount and the engine rotational speed, the fuel injection timing is determined. Thus, the final fuel injection amount can be properly determined by using the parameters indicative of behaviors of fuel, and the fuel injection timing can be determined based on the final fuel injection amount. Therefore, differently from the prior art, it is possible to properly determine the fuel injection timing such that the fuel injection timing reflects behaviors of fuel, i.e. influence of dynamic behaviors of fuel, such as deposition of fuel, and influence of purge of evaporative fuel. This enables improvement of drivability and fuel economy.

Preferably, the fuel injection control system further includes engine temperature-detecting means for detecting a temperature of the engine, and fuel injection timing-correcting means for correcting the fuel injection timing based on the detected temperature of the engine, during the homogenous combustion mode.

According to this fuel injection control system, the fuel injection timing is corrected based on the detected temperature of the engine, during the homogenous combustion mode. Therefore, it is possible to properly set the fuel injection timing such that the fuel injection timing reflects the temperature of the engine. For instance, during the homogenous combustion mode, if the piston is cold due to a low engine temperature, in view of a high tendency for forming unatomized fuel droplets when the distance between an injector from which fuel is injected and the piston is large, by advancing the fuel injection timing, it is possible to promote atomization of fuel to thereby ensure excellent combustion of fuel.

Preferably, the fuel injection timing-determining means determines start timing of the fuel injection by calculating back the start timing from termination timing of the fuel injection calculated based on the detected engine rotational speed, by using a time period corresponding to the final fuel injection amount.

Preferably, the operating condition-detecting means includes fuel pressure-detecting means for detecting a fuel pressure of fuel to be injected into the cylinder, and the fuel injection amount-determining means includes fuel injection amount-correcting means for correcting the final fuel injection amount according to the detected fuel pressure.

Preferably, the operating condition-detecting means includes fuel pressure-detecting means for detecting a fuel pressure of fuel to be injected into the cylinder, and the parameter-calculating means includes parameter-correcting means for correcting the parameters according to the detected fuel pressure.

Preferably, the parameters indicative of behaviors of fuel are a ratio of an amount of part of injected fuel which is injected in the present combustion cycle, the part of the injected fuel being actually burned in the present combustion cycle, to an amount of the injected fuel, and a ratio of an amount of part of deposited fuel which was left deposited on inner walls of a combustion chamber defined within the cylinder at an end of the immediately preceding combustion cycle, the part of the deposited fuel being actually burned in the present combustion cycle, to an amount of the deposited.

The above and other objects, features, and advantages of the invention will become more apparent from the following detailed description taken in conjunction with the accompanying drawings.

BRIEF DESCRIPTION OF THE DRAWINGS

FIG. 11 shows a map for use in determining a value of a monitor S_EMOD in FIG. 10;

FIG. 12 is a flowchart showing a subroutine for carrying out an injection termination timing-calculating process for stoichiometric combustion in FIG. 10;

DETAILED DESCRIPTION OF THE PREFERRED EMBODIMENT

Figure 1:
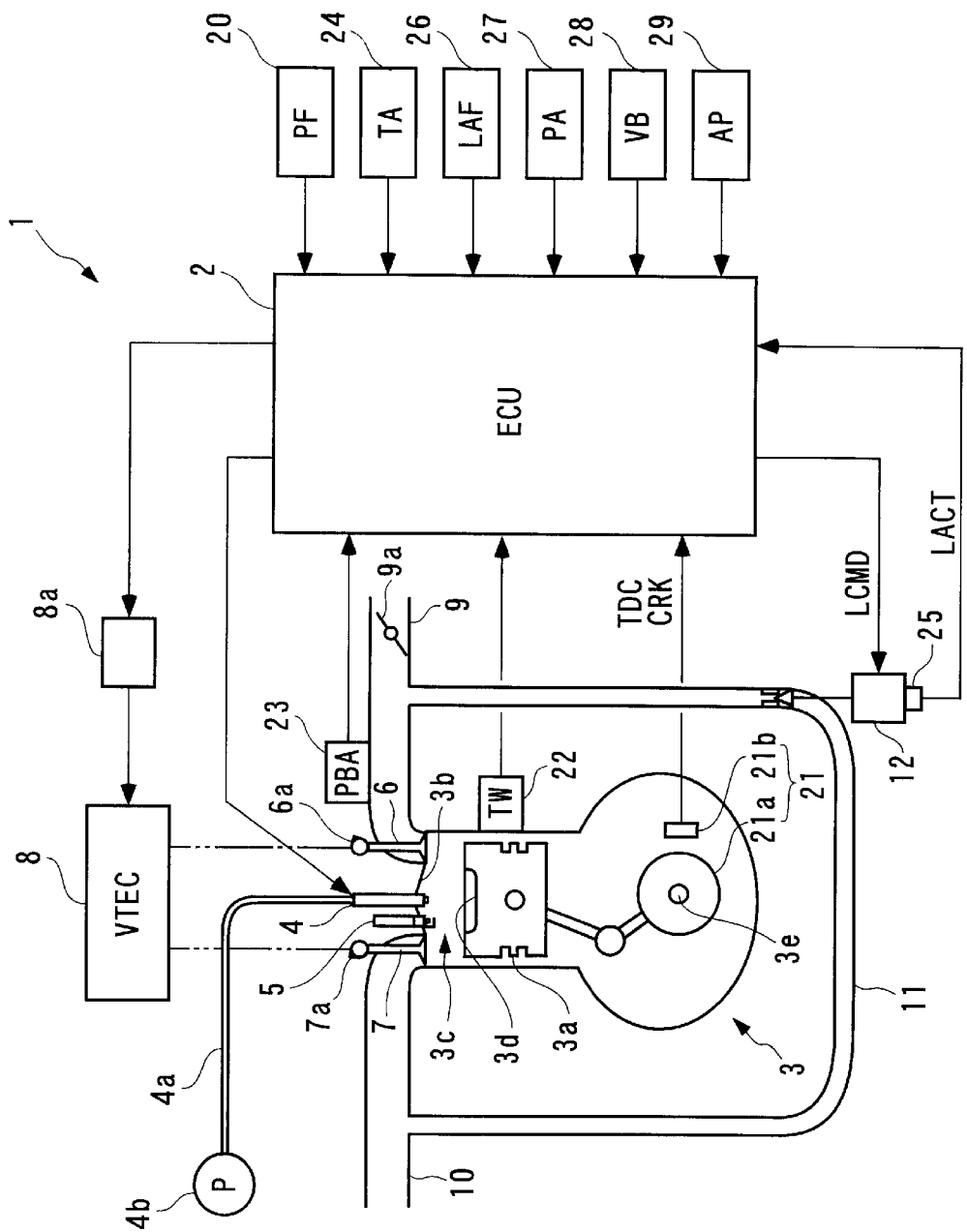
FIG. 1 is a block diagram schematically showing the arrangement of an internal combustion engine incorporating a fuel injection control system according to an embodiment of the invention.

The invention will now be described in detail with reference to the drawings showing an embodiment thereof. Referring first to FIG. 1, there is schematically shown the arrangement of a fuel injection control system for an internal combustion engine, according to an embodiment of the invention. As shown in the figure, the fuel injection control system 1 includes an ECU 2 (operating condition-detecting means, required fuel amount-determining means, parameter-calculating means, fuel injection amount-determining means, engine rotational speed-detecting means, fuel injection timing-determining means, fuel injection timing-correcting means). The ECU 2 carries out fuel injection control and ignition timing control of the internal combustion engine 3 (hereinafter simply referred to as "the engine 3").

The engine 3 is a straight type four-cylinder gasoline engine. The engine 3 has four cylinders (only one of the cylinders is shown in the figure) in each of which a combustion chamber 3c is formed between the piston 3a and a cylinder head 3b. The piston 3a has a top surface thereof formed with a recess 3d in the center thereof. The cylinder head 3b has a fuel injection valve 4 (hereinafter simply referred to as "the injector 4") and a spark plug 5 mounted therein such that they face the combustion chamber 3c. The engine 3 is a so-called in-cylinder fuel injection type in which fuel is directly injected into the combustion chamber 3c.

The injector 4 is arranged in a central portion of a top wall of the combustion chamber 3c and connected to a high-pressure pump 4b via a fuel pipe 4a. Fuel is pressurized by the high-pressure pump to a high pressure, and then supplied to the injector 4 in a state of the pressure thereof being regulated by a regulator, not shown. The fuel is injected from the injector 4 toward the recess 3d of the piston 3a, and hits the top surface of the piston 3a including the recess 3d to form fuel jets. Particularly, in a stratified combustion mode, referred to hereinafter, most of the fuel injected by the injector 4 hits the recess 3d to form fuel jets.

A fuel pressure sensor 20 is mounted in a portion of the fuel pipe 4a at a location in the vicinity of the injector 4. The fuel pressure sensor (fuel pressure-detecting means) 20 detects a fuel pressure PF of the fuel injected by the injector 4 and delivers a signal indicative of the sensed fuel pressure to the ECU 2. Further, the injector 4 is electrically connected to the ECU 2, and a final fuel injection time period Tout (i.e. fuel injection amount) over which the injector 4 is open and a fuel injection timing θinj (i.e. a valve-opening timing and a valve-closing timing) of the same are controlled by a drive signal delivered from the ECU 2, as described in detail hereinafter.

The spark plug 5 is also connected to the ECU 2, and a high voltage is applied to the spark plug 5 at an ignition timing θig indicated by a drive signal delivered from the ECU 2, for electric discharge, whereby an air-fuel mixture is burned in the combustion chamber 3c.

An intake cam 6a for opening and closing an intake valve 6 of each cylinder and an exhaust cam 7a for opening and closing an exhaust valve 7 of the same are each comprised of a low-speed cam and a high-speed cam having a higher cam nose than that of the low-speed cam. Further, the engine 3 is provided with a valve timing changeover mechanism 8 (hereinafter referred to as "the VTEC 8") and an oil pressure control valve 8a for controlling supply and stop of supply of an oil pressure to the VTEC 8.

The VTEC 8 switches the intake cam 6a (or the exhaust cam 7a) of each cylinder between the low-speed cam and the high-speed cam, to thereby change the valve timing of the intake valve 6 (or the exhaust valve 7) during its operation between a low-speed valve timing (hereinafter referred to as "LO.VT") and a high-speed valve timing (hereinafter referred to as "HI.VT"). The VTEC 8 switches the valve timing to HI.VT when oil pressure is supplied to the VTEC 8 via the oil pressure control valve 8a by the control of the ECU 2, and switches the same to LO.VT when the supply of the oil pressure is stopped.

Further, the valve timing is set to LO.VT in a lean combustion mode included in a homogeneous combustion mode or the stratified combustion mode, all described in detail hereinafter, whereas it is set to HI.VT in a stoichiometric combustion mode or a rich combustion mode included in the homogeneous combustion mode, also described in detail hereinafter. When the valve timing is switched to HI.VT, the intake valve 6 (or the exhaust valve 7) is opened and closed at an earlier timing than when the valve timing is held at LO.VT, and the amount of valve lift is also increased.

The engine 3 has a crankshaft 3e to which is mounted a magnet rotor 21a which constitutes a crank angle position sensor 21 together with an MRE (magnetic resistance element) pickup 21b. The crank angle position sensor 21 (engine rotational speed-detecting means, operating condition- detecting means) delivers to the ECU 2 a CRK signal and a TDC signal, which are both pulse signals, in accordance with rotation of the crankshaft 3e.

Each pulse of the CRK signal (CRK signal pulse) is generated whenever the crankshaft rotates through a predetermined angle (e.g. 30 degrees). The ECU 2 determines a rotational speed NE (parameter indicative of an operating condition of the engine, hereinafter referred to as "the engine rotational speed NE") of the engine 3, based on the CRK signal. The TDC signal (TDC signal pulse) is indicative of a predetermined crank angle position of each cylinder in the vicinity of a top dead center (TDC) position at the start of an intake stroke of the piston 3a in the cylinder, and each pulse of the TDC signal is generated whenever the crankshaft rotates through 180 degrees in the case of the four-cylinder engine 3 according to the embodiment. Further, the engine 3 is provided with a cylinder-discriminating sensor, not shown. The cylinder-discriminating sensor generates a cylinder-discriminating signal which is a pulse signal for discriminating each cylinder from the other ones to deliver the signal to the ECU 2. The ECU 2 determines which of the strokes and which crank angle position in the determined stroke each cylinder is in, based on the cylinder-discriminating signal, the CRK signal, and the TDC signal.

An engine coolant temperature sensor 22 (engine temperature-detecting means, operating condition-detecting means) formed of a thermistor is mounted in the cylinder block of the engine 3. The engine coolant temperature sensor 22 senses an engine coolant temperature TW (engine temperature, parameter indicative of an operating condition of the engine) which is a temperature of an engine coolant circulating within the cylinder block of the engine 3 and supplies an electric signal indicative of the sensed engine coolant temperature to the ECU 2.

At a location downstream of a throttle valve 9a arranged in an intermediate portion of an intake pipe 9 of the engine 3, there is arranged an intake pipe absolute pressure sensor (operating condition-detecting means) 23 in a manner inserted into the intake pipe 9. The intake pipe absolute pressure sensor 23 formed e.g. by a semiconductor pressure sensor senses an intake pipe absolute pressure PBA (parameter indicative of an operating condition of the engine) within the intake pipe 5, and delivers a signal indicative of the sensed absolute pressure PBA to the ECU 2. Further, an intake air temperature sensor 24 is inserted into the intake pipe 9 at a location downstream of the intake pipe absolute pressure sensor 23. The intake air temperature sensor (operating condition-detecting means) 24 formed of a thermistor senses an intake air temperature TA (parameter indicative of an operating condition of the engine) within the intake pipe 9 and delivers a signal indicative of the sensed temperature TA to the ECU 2.

Further, the engine 3 has an EGR pipe 11 connecting between the intake pipe 9 and an exhaust pipe 10. Exhaust gases emitted from the engine 3 are recirculated toward an intake side of the engine 3 through the EGR pipe 11 to lower a combustion temperature within the combustion chamber 3c, whereby EGR operation is carried out to reduce NOx contained in the exhaust gases. The EGR pipe 11 has one end thereof connected to the intake pipe 9 at a location downstream of the throttle valve 9a and the other end thereof connected to the exhaust pipe 10 at a location upstream of a catalyst device, not shown.

The EGR pipe 11 has an EGR control valve 12 mounted therein. The EGR control valve 12 is formed by a linear solenoid valve. The amount of valve lift of the EGR control valve 12 is changed linearly in response to a drive signal from the ECU 2, whereby the EGR pipe 11 is controlled to be opened and closed. The EGR control valve 12 is provided with a valve lift sensor 25 that senses an actual valve lift amount LACT of the EGR control valve 12 to deliver a signal indicative of the sensed valve lift amount to the ECU 2.

The ECU 2 calculates a desired valve lift amount LCMD of the EGR control valve 12 in response to the operating conditions of the engine 3 and controls the EGR control valve 12 such that the actual valve lift amount LACT becomes equal to the desired valve lift amount LCMD, to thereby control an EGR rate.

A LAF sensor 26 is arranged at a location upstream of the catalyst device. The LAF sensor 26 is comprised of zirconia, platinum electrodes, and the like, and linearly detects the concentration of oxygen in exhaust gases in a broad air-fuel ratio range from a rich region to a lean region, to deliver a signal proportional to the sensed concentration of oxygen to the ECU 2.

Further, the engine 3 has an atmospheric pressure sensor (operating condition-detecting means) 27 mounted thereto. The atmospheric pressure sensor 27 formed e.g. by a semiconductor pressure sensor senses an atmospheric pressure PA (parameter indicative of an operating condition of the engine 3), and delivers a signal indicative of the sensed atmospheric pressure PA to the ECU 2. Further, the ECU 2 has a battery sensor 28 connected thereto. The battery sensor 28 detects a voltage VB of a battery, not shown, for supplying a drive voltage to the injectors 4, and delivers a signal indicative of the sensed voltage VB to the ECU 2. An accelerator pedal sensor 29 is mounted in an automotive vehicle on which the engine 3 is installed. The accelerator pedal sensor 29 (operating condition-detecting means) detects an operation amount or stepping amount AP of an accelerator pedal, not shown, (hereinafter referred to as "the accelerator pedal opening AP") and delivers a signal indicative of the sensed accelerator pedal opening AP to the ECU 2.

The ECU 2 is formed by a microcomputer including a CPU, a RAM, a ROM, and an I/O interface, none of which are shown. The signals input from the sensors 20 to 29 to the ECU 2 are each delivered to the I/O interface for A/D conversion and waveform shaping, and then input into the CPU. The CPU carries out various kinds of arithmetic operations based on control programs read from the ROM, and various flags and calculation values, referred to hereinafter, read from and stored in the RAM.

More specifically, the ECU 2 executes a fuel injection control process including an air-fuel ratio control process to thereby control the final fuel injection time period Tout and the fuel injection timing θinj, as described in detail hereinafter. Further, the ECU 2 performs control of the ignition timing θig of the spark plug 5 in addition to the fuel injection control to thereby switch the combustion mode to the stratified combustion mode for an extremely low-load operation of the engine 3, such as idling, and to the homogeneous combustion mode for the other operations of the engine 3 than the extremely low-load operation.

In the stratified combustion mode, fuel is injected into the combustion chamber 3c through the injector 4 at a fuel injection timing θinj, which is determined as described hereinafter, during a compression stroke such that most of the injected fuel hits against the recess 3d, thereby forming fuel jets. The fuel jets and a flow of air taken in from the intake pipe 9 form an air-fuel mixture. At this time, the piston 3a in the compression stroke is near the top dead center position, which causes the air-fuel mixture which is extremely leaner than the stoichiometric air-fuel ratio (e.g. 27 to 60) to be unevenly distributed in the combustion chamber or concentrated in the vicinity of the spark plug 5, whereby the mixture is burned by stratified combustion. On the other hand, in the homogeneous combustion mode, fuel is injected into the combustion chamber 3c through the injector 4 at a fuel injection timing θinj, which is determined as described hereinafter, during an intake stroke such that a richer air-fuel mixture (having an air-fuel ratio of e.g. 12 to 27) formed by the above-mentioned fuel jets and the flow of air is homogeneously distributed in the combustion chamber 3c than the mixture in the stratified combustion mode, whereby the mixture is burned by homogeneous combustion.

Figure 2:
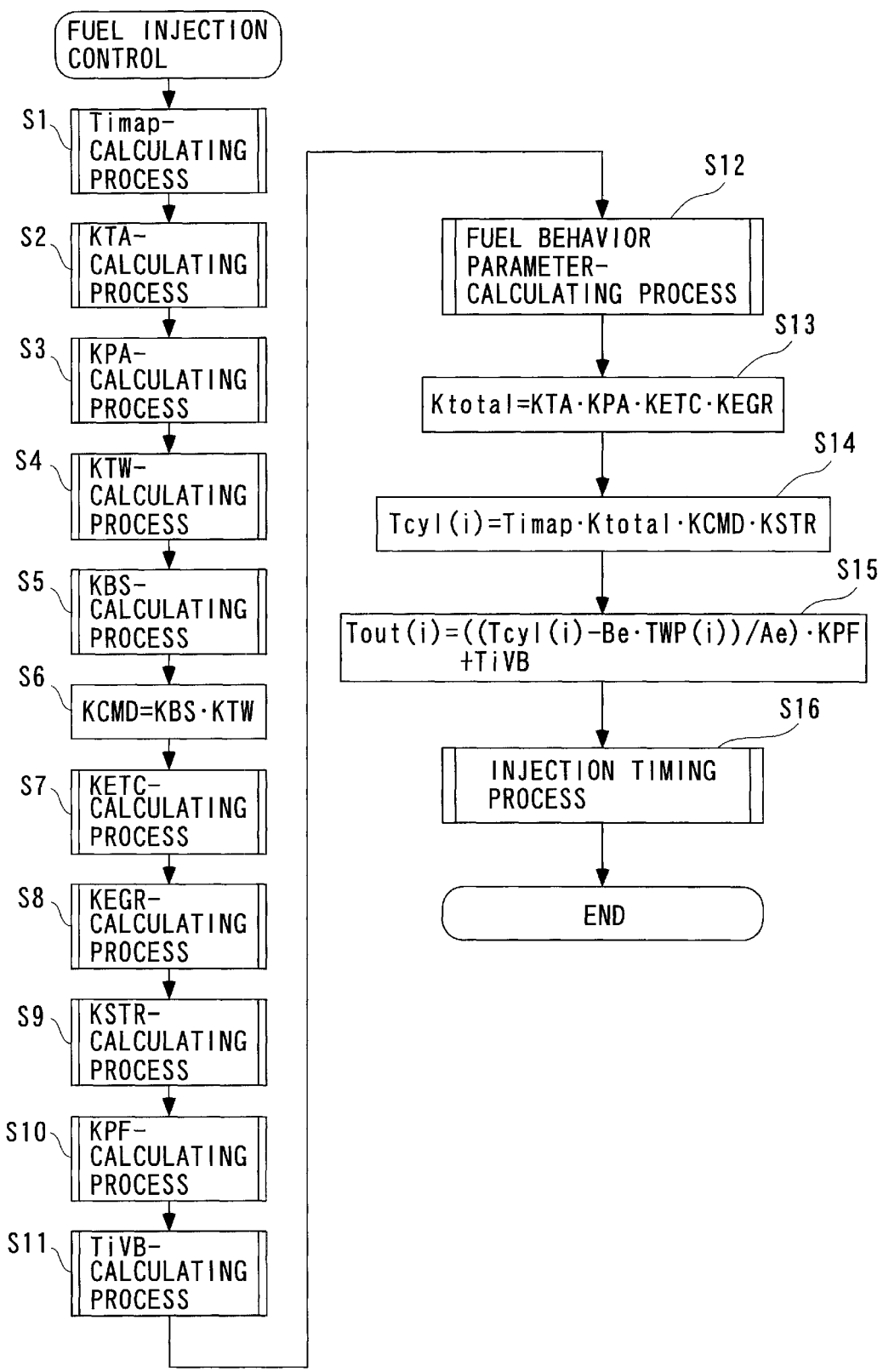
FIG. 2 is a flowchart showing a main routine of a fuel injection control process carried out by the FIG. 1 fuel injection control system.

In the following, the fuel injection control process including the air-fuel ratio control process, which is executed by the ECU 2, will be described in detail with reference to FIGS. 2 to 16. FIG. 2 shows a main routine for carrying out the control process, which is executed by an interrupt handling routine in synchronism with input of each TDC signal pulse. As described hereinafter, in the fuel injection control process, various correction coefficients are calculated (steps S2 to S13), and then the required fuel injection time period TCYL, the final fuel injection time period Tout, and the fuel injection timing inj are calculated by using these correction coefficients (steps S14 to S16).

First, at a step S1, a Timap-calculating process is executed. In this process, a basic fuel injection time period Timap is calculated by retrieval from a three-dimensional map (hereinafter simply referred to as "the map") according to the engine rotational speed NE and the intake pipe absolute pressure PBA.

Then, the program proceeds to a step S2, wherein a KTA-calculating process is executed. In this process, an intake air-dependent correction coefficient KTA is calculated by retrieval from a table, not shown, according to the intake air temperature TA.

Then, the program proceeds to a step S3, wherein a KPA-calculating process is executed. In the process, an atmospheric pressure-dependent correction coefficient KPA is calculated by retrieval from a table, not shown, according to the atmospheric pressure PA.

Then, the program proceeds to a step S4, wherein a KTW-calculating process is executed. In this process, a coolant temperature-dependent correction coefficient KTW is calculated by retrieval from a map, not shown, according to the engine coolant temperature TW and the intake pipe absolute pressure PBA.

Then, the program proceeds to a step S5, wherein a KBS-calculating process is executed. In this process, first, a required torque PME is calculated by retrieval from a map, not shown, according to the engine rotational speed NE and the accelerator-pedal opening AP. Subsequently, a basic desired air-fuel ratio coefficient KBS is calculated by retrieval from a map, not shown, according to the engine rotational speed NE and the required torque PME.

Then, the program proceeds to a step S6, wherein the basic desired air-fuel ratio coefficient KBS obtained at the step S5 is multiplied by the coolant temperature-dependent correction coefficient KTW obtained at the step S4, to thereby calculate a final desired air-fuel ratio coefficient KCMD. In other words, the final desired air-fuel ratio coefficient KCMD is calculated by correcting the basic desired air-fuel ratio coefficient KBS in accordance with the engine coolant temperature TW and the intake pipe absolute pressure PBA. The basic desired air-fuel ratio coefficient KBS and the final desired air-fuel ratio coefficient KCMD are each expressed as an equivalent ratio proportional to the reciprocal of the air-fuel ratio A/F.

Then, the program proceeds to a step S7, wherein a KETC-calculating process is executed. In this process, a charging efficiency-dependent correction coefficient KETC is calculated by retrieval from a table, not shown, according to the final desired air-fuel ratio coefficient KCMD obtained at the step S6. The charging efficiency-dependent correction coefficient KETC compensates for changes in charging efficiency due to changes in the air-fuel ratio A/F.

Next, the program proceeds to a step S8, wherein a KEGR-calculating process is executed. In this process, first, a basic EGR-dependent correction coefficient KEGRm is calculated by retrieval from a map, not shown, according to the required torque PME obtained at the step S5 and the engine rotational speed NE. Then, a lift amount-dependent correction coefficient KEGl is calculated based on the desired valve lift amount LCMD of the EGR control valve 12 and the actual valve lift amount LACT detected by the valve lift sensor 25.

Further, an intake pipe absolute pressure-dependent correction coefficient KEGRp is calculated based on the intake pipe absolute pressure PBA and a map value PBAm of the intake pipe absolute pressure. Then, the basic EGR-dependent correction coefficient KEGRm is multiplied by the lift amount-dependent correction coefficient KEGl and the intake pipe absolute pressure-dependent correction coefficient KEGRp to obtain the EGR-dependent correction coefficient KEGR (KEGR=KEGRm·KEGl·KEGRp). The EGR-dependent correction coefficient KEGR obtained as above compensates for changes in the amount of intake air caused by changes in the EGR rate.

Then, the program proceeds to a step 9, wherein a KSTR-calculating process is executed. In this process, a feedback correction coefficient KSTR is calculated by an adaptive controller of self-turning regulator type, not shown, based on the signal from the LAF sensor 26. The feedback correction coefficient KSTR is applied to the basic fuel injection time period Timap for dynamically compensating for a delay occurring due to a delay in the response of a fuel injection system when an actual air-fuel ratio becomes equal to a desired air-fuel ratio, to thereby improve convergence of the air-fuel feedback control.

Figure 3:
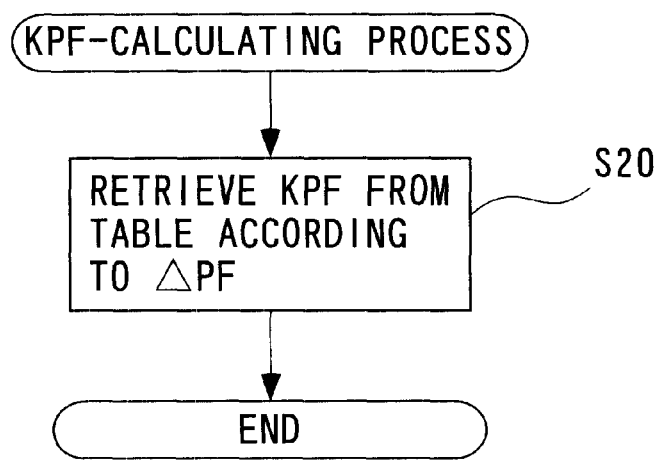
FIG. 3 is a flowchart showing a subroutine for carrying out a KPF-calculating process which is executed at a step S10 in FIG. 2.
Figure 4:
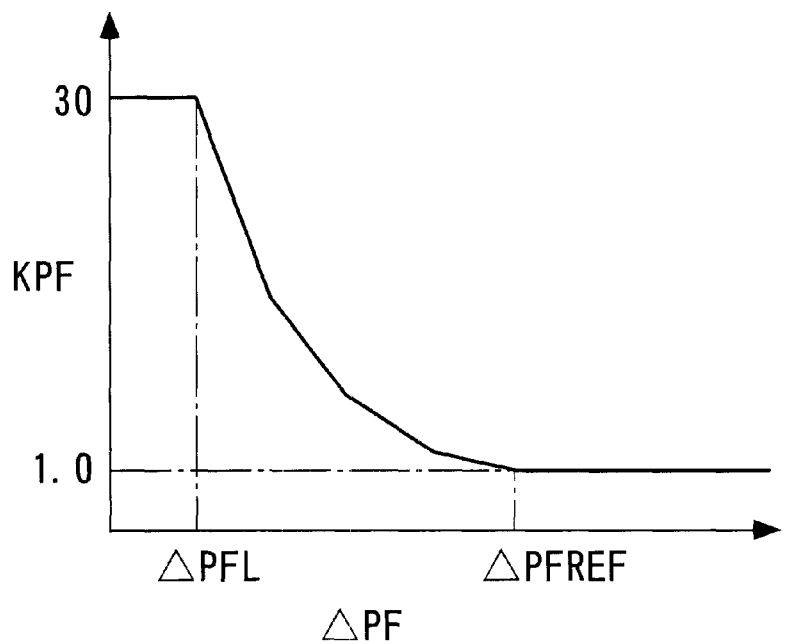
FIG. 4 shows an example of a ΔPF–KPF table for use in the FIG. 3 KPF-calculating process.

Then, the program proceeds to a step S10, wherein a KPF-calculating process is executed. In this process, as shown in FIG. 3, at a step S20, a fuel pressure-dependent correction coefficient KPF is calculated by retrieval from a ΔPF–KPF table an example of which is shown in FIG. 4 according to a differential pressure ΔPF (=PF–PCYL) which is a difference between the fuel pressure PF and a cylinder pressure (pressure within the cylinder) PCYL, followed by terminating the program. In this case, the cylinder pressure PCYL is estimated by retrieval from a table, not shown, according to the crank angle position of a corresponding cylinder. It should be noted that the method of calculating the cylinder pressure PCYL is not limited to this, but a cylinder pressure sensor for detecting the cylinder pressure PCYL may be mounted to the engine 3.

In the ΔPF–KPF table, the fuel pressure-dependent correction coefficient KPF is set to a value of 30 in a range where the differential pressure ΔPF is equal to or lower than a first predetermined value ΔPFL (e.g. 0.03 MPa), and to a value of 1.0 in a range where the differential pressure ΔPF is equal to or higher than a second predetermined value ΔPFREF (e.g. 10 MPa) higher than the first predetermined value ΔPFL. Further, when the differential pressure ΔPF is in a range between ΔPFL and ΔPFREF (ΔPFL<ΔPF<ΔPFREF), the fuel pressure-dependent correction coefficient KPF is set such that it becomes smaller as the differential pressure ΔPF is higher. The reason why the fuel pressure-dependent correction coefficient KPF is thus set within the range between ΔPFL and ΔPFREF (ΔPFL<ΔPF<ΔPFREF) is that when the injector 4 is opened over the final fuel injection time period Tout, described in detail hereinafter, it is required to compensate for changes occurring in the amount of actual injection of fuel caused by variation in the differential pressure ΔPF even if the final fuel injection time period Tout is set to an identical value (e.g. even if the final fuel injection time period Tout is set to an identical value, the amount of fuel actually injected increases as the differential pressure ΔPF becomes larger).

Further, the reason why the fuel pressure-dependent correction coefficient KPF is set as above in the range of ΔPFL≦ΔPFREF is that when the differential pressure ΔPF is equal to or lower than the value ΔPFL in the stratified combustion mode, the amount of fuel actually injected does not change as long as the final fuel injection time period Tout is not changed. On the other hand, the reason why the fuel pressure-dependent correction coefficient KPF is set as above in the range of ΔPFL≧ΔPFREF is that when the differential pressure ΔPF is equal to or higher than the value ΔPFREF in the homogeneous combustion mode, the amount of fuel corresponding to the desired air-fuel ratio is reliably injected when the injector 4 is opened over the final fuel injection time period Tout. It should be noted that in the in-cylinder fuel injection engine 3, the fuel pressure PF is much higher than the cylinder pressure PCYL (e.g. the fuel pressure PF is one hundred times as high as the cylinder pressure PCYL), so that the fuel pressure PF may be used in place of the differential pressure ΔPF, as a parameter for use in calculating the fuel pressure-dependent correction coefficient KPF.

After the KPF-calculating process is executed as above, the program proceeds to a step S11 in FIG. 2, wherein a TiVB-calculating process is executed. In this process, an ineffective time-dependent correction term TiVB is calculated by retrieval from a table, not shown, according to the voltage value VB of the battery. The ineffective time-dependent correction term TiVB compensates for a delay time (ineffective time) until the injector 4 is actually opened for fuel injection.

Then, the program proceeds to a step S12, wherein a fuel behavior parameter-calculating process is executed. In this process, described in detail hereinafter, a direct ratio Ae (parameter indicative of a behavior of fuel) and a take-off ratio Be (parameter indicative of a behavior of fuel) are calculated.

Then, the program proceeds to a step S13, wherein the intake air-dependent correction coefficient KTA, the atmospheric pressure-dependent correction coefficient KPA, the charging efficiency-dependent correction coefficient KETC, and the EGR-dependent correction coefficient KEGR are multiplied by each other to calculate a total correction coefficient Ktotal.

Then, the program proceeds to a step S14, wherein the basic fuel injection time period Timap is multiplied by the total correction coefficient Ktotal, the final desired air-fuel ratio coefficient KCMD, and the feedback correction coefficient KSTR to calculate a required fuel injection time period Tcyl(i) on a cylinder-by-cylinder basis. The required fuel injection time period Tcyl(i) corresponds to the amount of fuel required for each cylinder depending on the operating condition of the engine 3. The symbol (i) of the required fuel injection time period Tcyl(i) represents a cylinder number.

Then, the program proceeds to a step S15, wherein a final fuel injection time period Tout(i) which represents a valve-opening time period of the injector 4 of each cylinder, i.e. the amount of fuel to be actually injected into each cylinder is calculated by the use of the following equation (1):

$$Tout(i) ((Tcyl(i)-Be \cdot TWP(i))/Ae) \cdot KPF+TiVB \qquad (1)$$

wherein TWP(i) represents a deposited-fuel amount-equivalent value (time period) equivalent to the amount of fuel deposited in each cylinder, and it is obtained as described hereinafter.

As is apparent from the steps S14, S15, the required fuel injection time period Tcyl(i) determining a required fuel amount depending on the operating conditions of the engine 3 is calculated without using the fuel pressure-dependent correction coefficient KPF. The required fuel injection time period Tcyl(i) by nature is irrelevant to the fuel pressure PF, so that the required fuel injection time period Tcyl(i) can be properly calculated without using the fuel pressure-dependent correction coefficient KPF. On the other hand, in calculation of the final fuel injection time period Tout(i) determining the amount of fuel to be actually injected into each cylinder, the basic fuel injection time period Timap is multiplied by the fuel pressure-dependent correction coefficient KPF. This makes it possible to properly correct the amount of fuel to be actually injected by each injector 4 according to the differential pressure ΔPF between the fuel pressure PF and the cylinder pressure PCYL. As a result, it is possible to perform accurate control of the amount of fuel actually injected into each cylinder. Thus, it is possible to determine the fuel injection amount properly according to the desired air-fuel ratio, thereby enhancing the convergence of the feedback control of the air-fuel ratio A/F.

Figure 16:
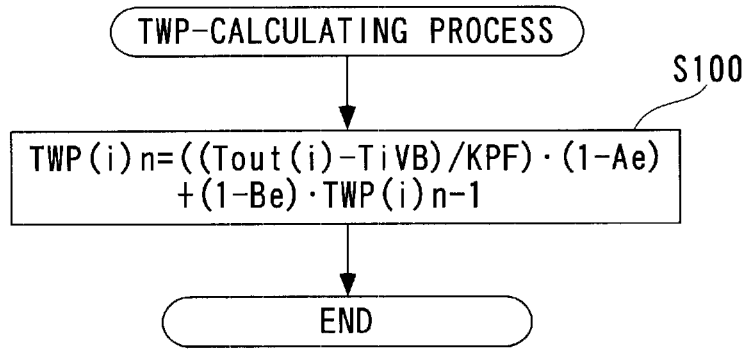
FIG. 16 is a flowchart of a TWP-calculating process.

Next, the TWP-calculating process for calculating the deposited-fuel amount-equivalent value TWP(i) used in the equation (1) will be described with reference to FIG. 16. This process is carried out in synchronism with input of the CRK signal on a cylinder-by-cylinder basis. In the process, at a step S100, the present value TWP(i)n of the deposited-fuel amount-equivalent value TWP(i) is calculated by the use of the following equation (2):

$$TWP(i)n=((Tout(i)-TiVB)/KPF)\cdot(1-Ae)+(1-B)\cdot TWP(i)n-1 \quad (2)$$

wherein TWP(i)n−1 represents the immediately preceding value of the deposited-fuel amount-equivalent value TWP (i). Then, the value TWP(i)n is stored in the RAM, followed by terminating the TWP-calculating process.

Referring again to FIG. 2, after execution of the step S15, the program proceeds to a step S16, wherein the fuel injection timing θinj is calculated by a fuel injection timing process, followed by terminating the present routine. The fuel injection timing process will be described in detail hereinafter.

Figure 5:
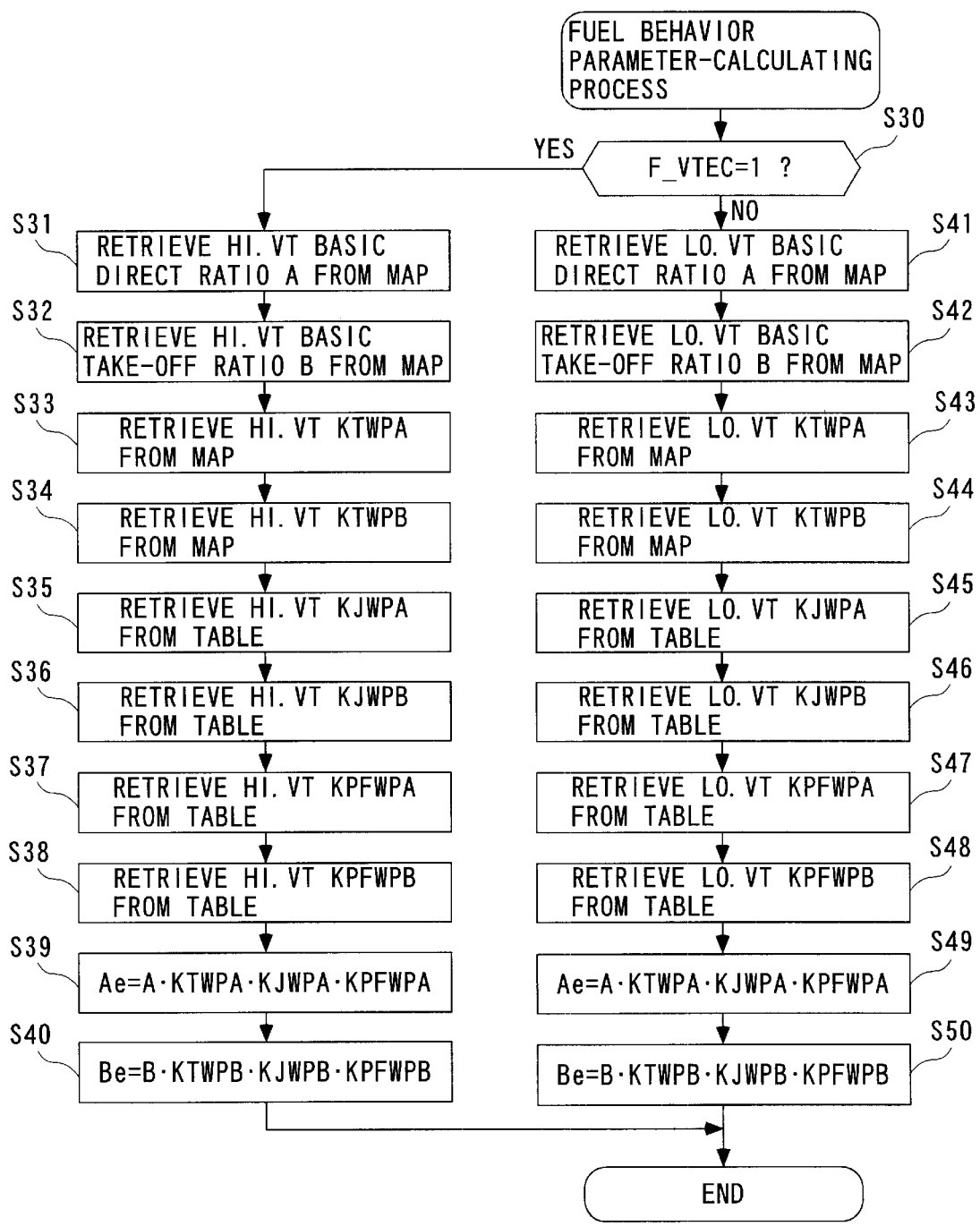
FIG. 5 is a flowchart showing a subroutine for carrying out a fuel behavior parameter-calculating process which is executed at a step S12 in FIG. 2.

Next, the fuel behavior parameter-calculating process executed at the step S12 will be described in detail with reference to FIG. 5. In this process, the direct ratio Ae and the carry-off ratio Be are calculated as mentioned below. The direct ratio Ae represents a ratio of the amount of part of injected fuel which is injected by the injector 4 in the present combustion cycle, the part of the injected fuel being actually burned in the present combustion cycle, to the whole amount of the injected fuel. On the other hand, the carry-off ratio Be represents a ratio of the amount of part of deposited fuel which was left deposited on the inner walls (cylinder surfaces, piston surfaces, etc.) of the combustion chamber 3c at an end of the immediately preceding combustion cycle, the part of the deposited fuel being actually burned in the present combustion cycle, to the whole amount of the deposited fuel.

More specifically, first, it is determined at a step S30 whether or not a flag F_VTEC assumes "1". The flag F_VTEC is set to "1" when the valve timing is held at HI.VT by the VTEC 8, whereas when the valve timing is held at LO.VT, the flag F_VTEC is set to "0".

Figure 6:
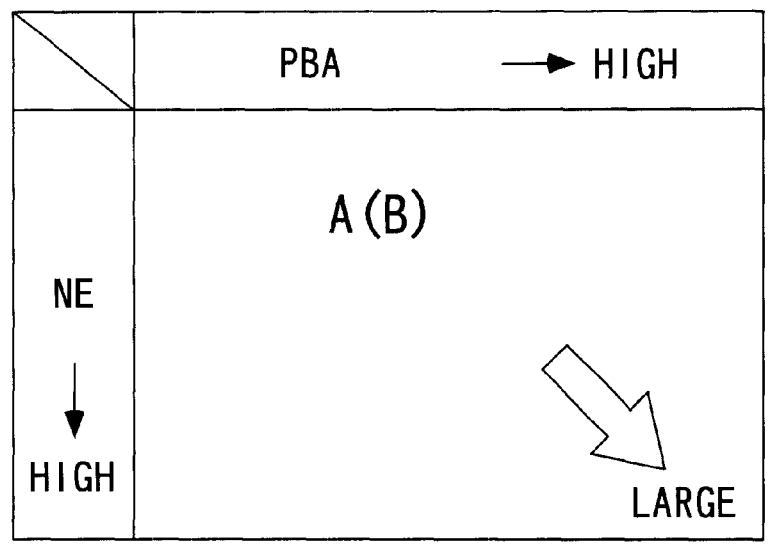
FIG. 6 shows a map for use in calculating a basic direct ratio A and a basic carry-off ratio B in the FIG. 5 process.

If the answer to the question of the step S30 is affirmative (YES), i.e. if the valve timing is held at HI. VT, the program proceeds to a step S31, wherein a basic direct ratio A for HI.VT is determined by retrieval from a map an example of which is shown in FIG. 6 according to the engine rotational speed NE and the intake air pipe absolute pressure PBA. In the map, the basic direct ratio A is set to a larger value as the engine rotational speed NE or the intake air pipe absolute pressure PBA is higher.

Then, the program proceeds to a step S32, wherein, similarly to the calculation of the basic direct ratio A at the step S31, a basic carry-off ratio B for HI.VT is determined by retrieval from a map similar to that shown in FIG. 6 according to the engine rotational speed NE and the intake air pipe absolute pressure PBA. In the map, the carry-off ratio B is set such that it changes with a similar tendency to that of the basic direct ratio A, but is set to each individual value different from a corresponding value of the basic direct ratio A.

Figure 7:
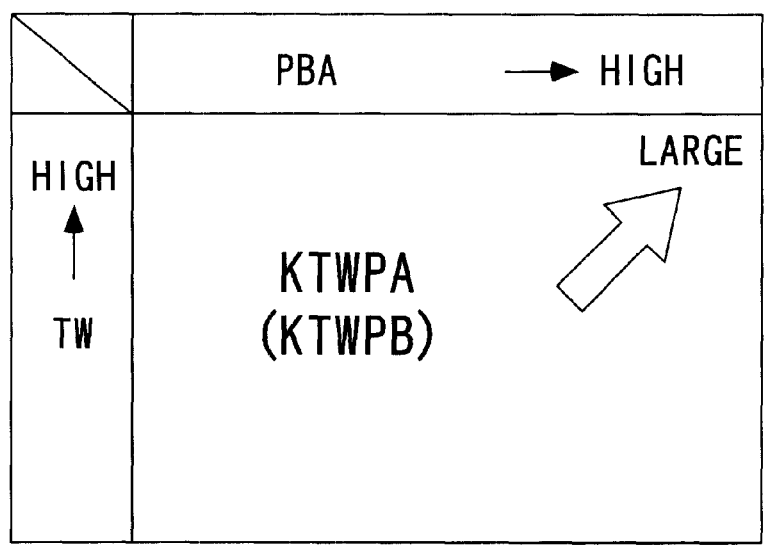
FIG. 7 shows a map for use in calculating coolant temperature-dependent correction coefficients KTWPA, KTWPB in the FIG. 5 process.

Then, the program proceeds to a step S33, wherein a coolant temperature-dependent correction coefficient KTWPA for use in correcting the basic direct ratio A for HI.VT is determined by retrieval from a map an example of which is shown in FIG. 7 according to the engine coolant temperature TW and the intake air pipe absolute pressure PBA. In the map, the coolant temperature-dependent correction coefficient KTWPA is set to a larger value as the engine coolant temperature TW or the intake air pipe absolute pressure PBA is higher.

Then, the program proceeds to a step S34, wherein, similarly to the coolant temperature-dependent correction coefficient KTWPA, a coolant temperature-dependent correction coefficient KTWPB for use in correcting the carry-off ratio B for HI.VT is determined by retrieval from a map similar to that shown in FIG. 7 according to the engine coolant temperature TW and the intake air pipe absolute pressure PBA. In the map, the coolant temperature-dependent correction coefficient KTWPB is set such that it changes with a similar tendency to that of the coolant temperature-dependent correction coefficient KTWPA, but is set to each individual value different from a corresponding value of the correction coefficient KTWPA.

Figure 8:
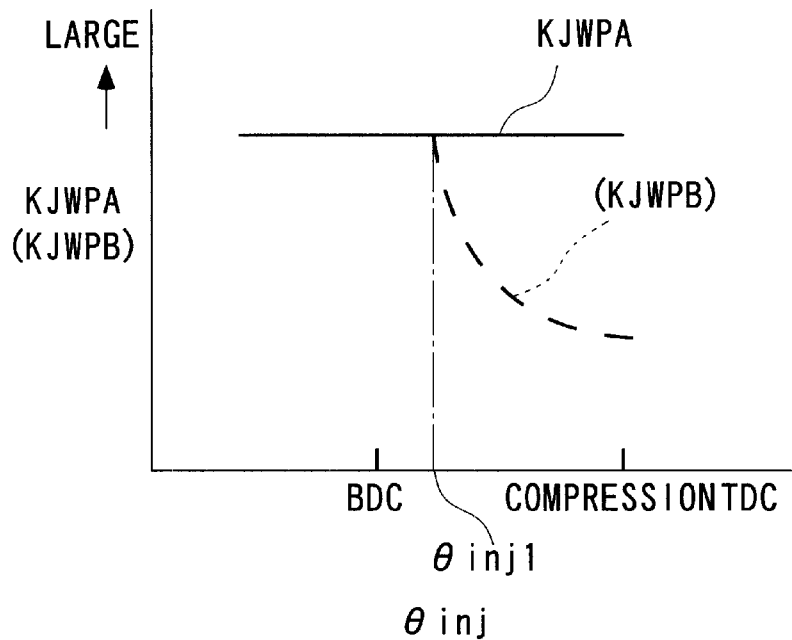
FIG. 8 shows an example of a table for use in calculating injection timing correction coefficients KJWPA, KJWPB in the FIG. 5 process.

Then, the program proceeds to a step S35, wherein an injection timing-dependent correction coefficient KJWPA for use in correcting the basic direct ratio A for HI.VT is determined by retrieval from a table an example of which is shown in FIG. 8 according to the immediately preceding value of the fuel injection timing θinj obtained at the step S16. As shown in this figure, in the table, the injection timing-dependent correction coefficient KJWPA is set to a constant value, irrespective of the fuel injection timing θinj.

Then, the program proceeds to a step S36, wherein, similarly to the calculation of the injection timing-dependent correction coefficient KJWPA, an injection timing-dependent correction coefficient KJWPB for use in correcting the carry-off ratio B for HI.VT is determined by retrieval from the FIG. 8 table according to the immediately preceding value of the fuel injection timing θinj obtained at the step S16. As shown in this figure, in this table, when the fuel injection timing θinj is on an advanced angle side with respect to a predetermined crank angle θinj1 between a BDC position in a second half of each intake stroke and a TDC position in each compression stroke, the injection timing-dependent correction coefficient KJWPB is set to a constant value, similarly to the injection timing-dependent correction coefficient KJWPA, whereas the injection timing-dependent correction coefficient KJWPB is set to a smaller value as the fuel injection timing θinj is more delayed with respect to the predetermined crank angle θinj1, i.e. as the fuel injection timing θinj is closer to the TDC position in each compression stroke. The reason why the injection timing-dependent correction coefficient KJWPB is thus set is that during the compression stroke of a piston, as the piston is closer to the TDC position, the cylinder pressure PCYL is increased, and hence it is difficult to vaporize fuel deposited on the inner walls of the combustion chamber 3c.

Figure 9:
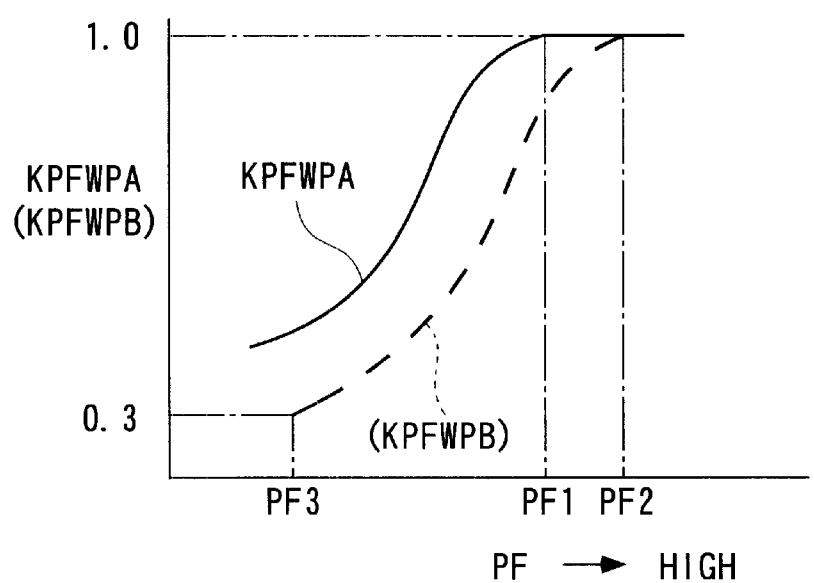
FIG. 9 shows an example of a table for use in calculating fuel pressure-dependent correction coefficients KPFWPA, KPFWPB in the FIG. 5 process.

Then, the program proceeds to a step S37, wherein a fuel pressure-dependent correction coefficient KPFWPA for use in correcting the basic direct ratio A for HI.VT is determined by retrieval from a table an example of which is shown in FIG. 9 according to the fuel pressure PF. As shown in the figure, in this table, when the fuel pressure is lower than a predetermined value PF1, the fuel pressure-dependent correction coefficient KPFWPA is set to a larger value as the fuel pressure PF is higher. The reason why the correction coefficient KPFWPA is thus set is that as the fuel pressure PF is lower, fuel is less readily atomized and hence more like to be deposited on the inner walls of the combustion chamber 3c, whereas as the fuel pressure PF is higher, fuel is more readily atomized and hence less likely to be deposited on the same. On the other hand, when the fuel pressure PF is equal to or higher than the predetermined value PF1, the correction coefficient KPFWPA is set to 1.0. This is because the rate of deposition of fuel on the inner walls of the combustion chamber 3c is substantially constant when the fuel pressure PF is equal to or higher than the predetermined value PF1.

Then, the program proceeds to a step S38, wherein, similarly to the calculation of the correction coefficient KPFWPA, a fuel pressure-dependent correction coefficient KPFWPB for use in correcting the basic carry-off ratio B for HI.VT is determined by retrieval from the FIG. 9 table according to the fuel pressure PF. As shown in the figure, in this table, when the fuel pressure is below a predetermined value PF2, the fuel pressure-dependent correction coefficient KPFWPB is set to a larger value as the fuel pressure PF is higher. The reason why the correction coefficient KPFWPB is thus set is that as the fuel pressure PF is higher, fuel deposited on the inner walls of the combustion chamber 3c is more readily removed therefrom and atomized. On the other hand, when the fuel pressure PF is equal to or higher than the predetermined value PF2, the correction coefficient KPFWPB is set to 1.0. This is because when the fuel pressure PF is equal to or higher than the predetermined value PF2, the ratio of the amount of part of deposited fuel deposited on the inner walls of the combustion chamber 3c, which part is actually burned in the present combustion cycle, to the whole amount of the deposited fuel, remains unchanged.

Then, the program proceeds to a step S39, wherein the direct ratio Ae is calculated by multiplying the basic direct ratio A obtained as above by the coolant temperature-dependent correction coefficient KTWPA, the injection timing-dependent correction coefficient KJWPA, and the fuel pressure-dependent correction coefficient KPFWPA.

Then, the program proceeds to a step S40, wherein, similarly to the direct ratio Ae, the carry-off ratio Be is calculated by multiplying the basic carry-off ratio B by the coolant temperature-dependent correction coefficient KTWPB, the injection timing-dependent correction coefficient KJWPB, and the fuel pressure-dependent correction coefficient KPFWPB.

On the other hand, if the answer to the question of the step S30 is negative (NO), i.e. if the valve timing is held at LO.VT, a direct ratio Ae and a carry-off ratio Be for LO.VT are calculated by the following steps S41 to 50 similarly to the steps S31 to 40, followed by terminating the program. In this case, maps and tables used at the steps S41 to 48 are set such that they each exhibit similar tendency to a corresponding one of the maps and tables used for calculation of the direct ratio Ae and the carry-off ratio Be for HI.VT, but have different corresponding values.

As described above, the direct ratio Ae and the carry-off ratio Be are obtained by correcting the basic direct ratio A and the basic carry-off ratio B, respectively, by the fuel pressure-dependent correction coefficients KPFWPA, KPF-WPB determined based on the fuel pressure PF. Then, the deposited-fuel amount-equivalent value TWP corresponding to the amount of deposited fuel is calculated by the use of the corrected direct ratio Ae and carry-off ratio Be. Since the fuel pressure PF and the deposited-fuel amount-equivalent value TWP are closely related to each other as described hereinabove with reference to the FIG. 9 table, it is possible to properly calculate the deposited-fuel amount-equivalent value TWP on a cylinder-by-cylinder basis such that the deposited-fuel amount-equivalent value TWP reflects the fuel pressure PF, by employing the above method of calculating the direct ratio Ae and the carry-off ratio Be and using these ratios. Further, since the basic direct ratio A and the basic carry-off ratio B are calculated separately according to the valve timing (LO.VT or HI.VT), it is possible to calculate the deposited-fuel amount-equivalent value TWP more properly in response to changes in the amount of intake air and the fuel injection timing θinj caused by switching of the valve timing. Thus, the final fuel injection time period Tout i.e. fuel injection amount can be properly determined, which makes it possible to enhance the convergence of the feedback control of the air-fuel ratio A/F.

Figure 10:
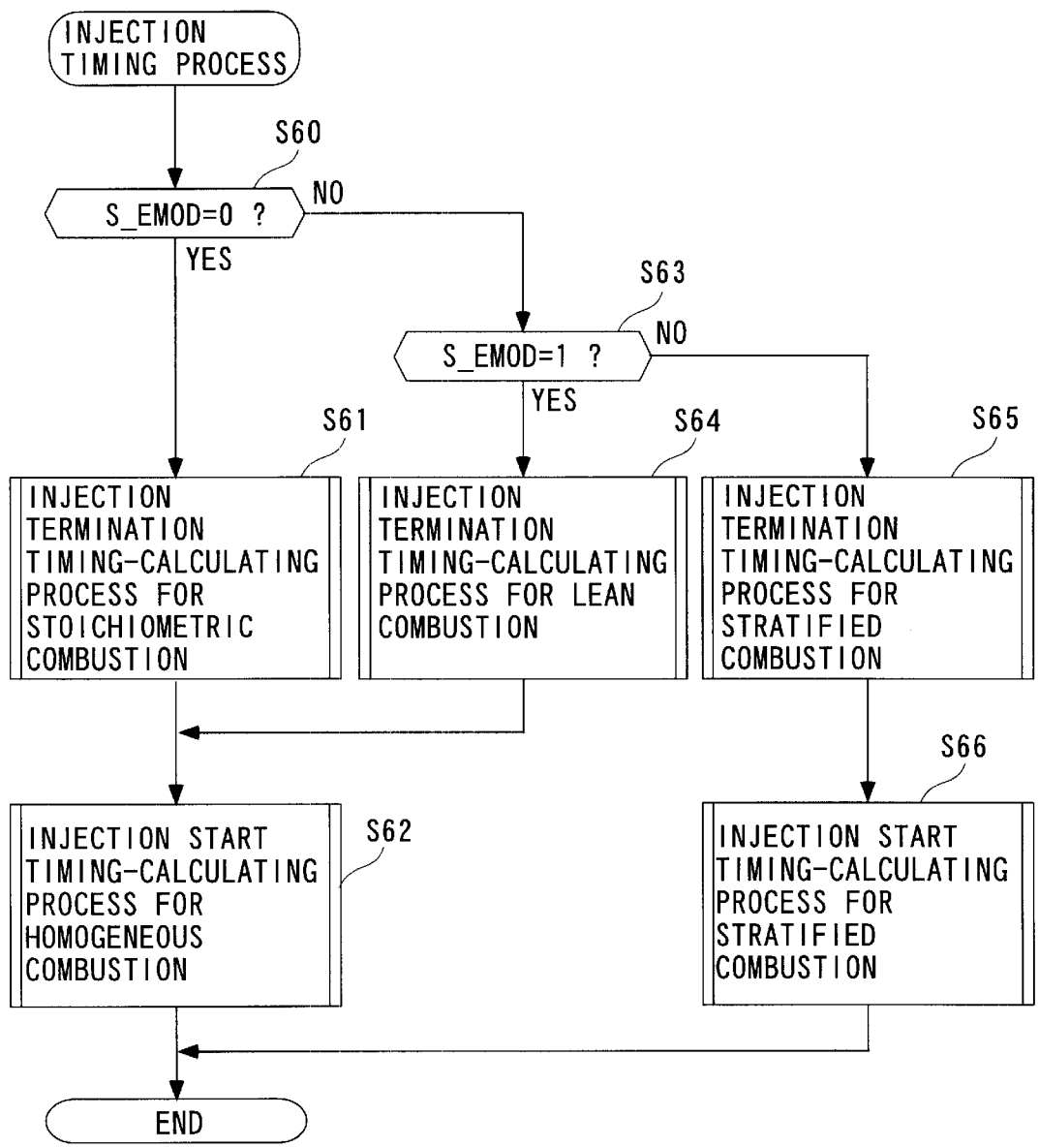
FIG. 10 is a flowchart showing a subroutine for carrying out an injection timing process which is executed at a step S16 in FIG. 2.

Next, the injection timing process executed at the step S16 will be described with reference to FIGS. 10 to 15. FIG. 10 shows a main routine for carrying out the injection timing process. As shown in the figure, in the process, first, it is determined at a step S60 whether or not a combustion mode monitor S_EMOD assumes "0".

The combustion mode monitor S_EMOD indicates which of the stratified combustion mode, and the lean combustion mode, the stoichiometric combustion mode, and the rich combustion mode included in the homogeneous combustion, the engine 3 is in. The value of the combustion mode monitor S_EMOD is set by retrieval from a map illustrated in FIG. 11 according to the required torque PME obtained at the step S5 and the engine rotational speed NE. More specifically, in the map, the value is set to "2" for a stratified combustion region, set to "1" for a lean combustion region, and set to "0" for a stoichiometric combustion region. The stoichiometric combustion region set in the map includes not only a region in which basically an air-fuel mixture having an air-fuel ratio equal to the stoichiometric air-fuel ratio is burned, but also a region in which an air-fuel mixture having an air-fuel ratio richer than the stoichiometric air-fuel ratio is burned. Therefore, "stoichiometric combustion" hereinafter includes rich combustion.

If the answer to the question of the step S60 is affirmative (YES), i.e. if S_EMOD=0 holds, which means that the engine 3 is being operated in the stoichiometric combustion mode, the program proceeds to a step S61, wherein an injection termination timing-calculating process for stoichiometric combustion is executed. In this process, which will be described in detail hereinafter, an injection termination timing IJLOGH of the fuel injection timing θinj for stoichiometric combustion is calculated.

Then, the program proceeds to a step S62, wherein an injection start timing-calculating process for homogeneous combustion is executed, followed by terminating the program. In this process, an injection start timing of the fuel injection timing θinj is calculated back from the injection termination timing IJLOGH obtained at the step S61 by using the final fuel injection time period Tout obtained at the step S15. The injection start timing and the injection termination timing IJLOGH are both calculated as respective crank angle positions with respect to the TDC position in each intake stroke.

On the other hand, if S_EMOD≠0 holds at the step S60, the program proceeds to a step S63, wherein it is determined whether or not the combustion mode monitor S_EMOD assumes "1". If the answer to the question is affirmative (YES), i.e. if S_EMOD=1 holds, which means that the engine 3 is being operated in the lean combustion mode, the program proceeds to a step S64, wherein an injection termination timing-calculating process for lean combustion, described in detail hereinafter, is executed to calculate an injection termination timing IJLOGH of the fuel injection timing θinj for lean combustion.

Then, the program proceeds to the step S62, wherein the injection start timing of the fuel injection timing θinj is calculated based on the injection termination timing IJLOGH obtained at the step S64 and the final fuel injection time period Tout, followed by terminating the program. At the steps S62, S64, similarly to the steps S61, S64, the injection start timing and the injection termination timing IJLOGH are both calculated as respective crank angle positions with respect to the TDC position in each intake stroke.

On the other hand, if the answer to the question of the step S63 is negative (NO), i.e. if S_EMOD=2 holds, which means that the engine 3 is being operated in the stratified combustion mode, the program proceeds to a step S65, wherein an injection termination timing-calculating process for stratified combustion is executed to calculate an injection termination timing IJLOGH of the fuel injection timing θinj for stratified combustion, similarly to the step S61, S64.

Then, the program proceeds to a step S66, wherein, similarly to the step S62, the injection start timing for stratified combustion is calculated based on the injection termination timing IJLOGH obtained at the step S65 and the final fuel injection time period Tout, followed by terminating the program. At the steps S65, S66, differently from the steps S61, S62, S64, the injection start timing and the injection termination timing IJLOGH are both calculated as respective crank angle positions with respect to the TDC position in each compression stroke.

Next, the injection termination timing-calculating process for stoichiometric combustion, which is executed at the step S61, will be described with reference to FIG. 12. In the process, as described below, the injection termination timing IJLOGH of the fuel injection timing θinj is calculated on a cylinder-by-cylinder basis, as a crank angle position after TDC (ATDC) of an intake stroke.

Figure 13:
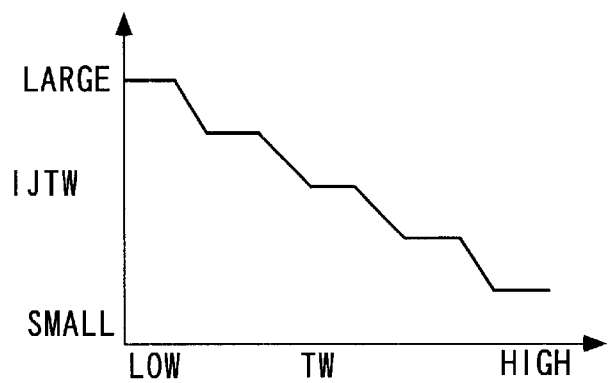
FIG. 13 shows an example of a table for use in calculating IJTW at a step S70 in FIG. 12 and at a step S80 in FIG. 14.

In the process, first, at a step S70, a coolant temperature-dependent correction term IJTW is determined. More specifically, the coolant temperature-dependent correction term IJTW is determined by retrieval from a TW-IJTW table an example of which is shown in FIG. 13, according to the engine coolant temperature TW. As shown in the figure, in the TW-IJTW table, the coolant temperature-dependent correction term IJTW is set to a smaller value as the engine coolant temperature TW is higher. The correction term IJTW is thus set so as to generate torque efficiently by advancing the injection termination timing IJLOGH of the fuel injection timing θinj since fuel injected into the combustion chamber 3c is easier to ignite as the engine coolant temperature TW is higher and hence homogeneous combustion is carried out more efficiently.

Then, at a step S71 in FIG. 12, it is determined whether or not the flag F_VTEC assumes "1". If the answer to the question is affirmative (YES), i.e. if the valve timing is held at HI.VT, the program proceeds to a step S72, wherein it is determined whether or not an EGR-permitting flag F_EGR assumes "1". The flag F_EGR is set to "1" when the EGR pipe 11 is opened by the EGR control valve 12 for execution of the EGR operation, whereas if the EGR pipe 11 is closed to inhibit the execution of EGR operation, the flag F_EGR is set to "0".

If the answer to the question of the step S72 is affirmative (YES), i.e. if the EGR operation is being executed, the program proceeds to a step S73, wherein a basic injection termination timing INJMAPF for HI.VT EGR operation is determined by retrieval from a map, not shown, according to the engine rotational speed NE and the final fuel injection time period Tout (i) obtained at the step S15 for each cylinder, on a cylinder-by-cylinder basis.

Then, the program proceeds to a step S75, and the injection termination timing IJLOGH is set to a value obtained by adding the coolant temperature-dependent correction term IJTW calculated at the step S70 to the basic injection termination timing INJMAPF for each cylinder, followed by terminating the program. Thus, the injection termination timing IJLOGH for HI.VT EGR operation is obtained for each cylinder.

On the other hand, if the answer to the question of the step S72 is negative (NO), i.e. if EGR operation is not being executed, the program proceeds to a step S74, wherein a basic injection termination timing INJMAPF for HI.VT NON-EGR operation is determined by retrieval from a map, not shown, similarly to the step S73, according to the engine rotational speed NE and the final fuel injection time period Tout(i) for each cylinder, on a cylinder-by-cylinder basis. Then, at the step S75, an injection termination timing IJLOGH for HI.VT NON-EGR operation is obtained for each cylinder, followed by terminating the program.

If the answer to the question of the step S71 is negative (NO), i.e. if the valve timing is held at LO.VT, the program proceeds to a step S76, wherein it is determined whether or not the EGR-permitting flag F_EGR assumes "1".

If the answer to this question is affirmative (YES), i.e. if EGR operation is being carried out, the program proceeds to a step S77, wherein similarly to the step S73, a basic injection termination timing INJMAPF for LO.VT EGR operation is retrieved from a map, not shown, according to the engine rotational speed NE and the final fuel injection time period Tout(i) for each cylinder, on a cylinder-by-cylinder basis. Then, at the step S75, an injection termination timing IJLOGH for LO.VT EGR operation is obtained for each cylinder, followed by terminating the program.

On the other hand, if the answer to the question of the step S76 is negative (NO), i.e. if the EGR operation is not being carried out, the program proceeds to a step S78, wherein similarly to the step S73, a basic injection termination timing INJMAPF for LO.VT NON-EGR operation is determined by retrieval from a map, not shown, according to the engine rotational speed NE and the final fuel injection time period Tout(i) for each cylinder, on a cylinder-by-cylinder basis. Then, at the next step S75, an injection termination timing IJLOGH for LO.VT NON-EGR operation is calculated on a cylinder-by-cylinder basis, followed by terminating the present program.

Figure 14:
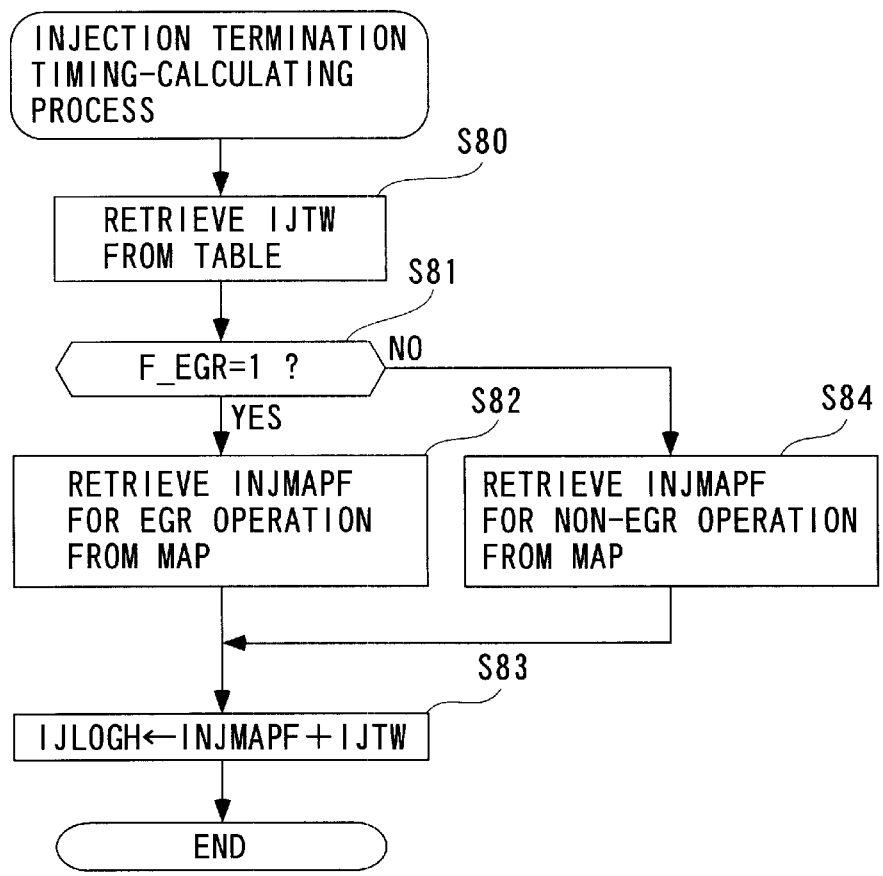
FIG. 14 is a flowchart showing a subroutine for carrying out an injection termination timing-calculating process for lean combustion in FIG. 10.

Next, the injection termination timing-calculating process for lean combustion, which is executed at the step S64, will be described with reference to FIG. 14. In this process, similarly to the injection termination timing for stoichiometric combustion, the injection termination timing IJLOGH is calculated as a crank angle position after TDC during an intake stroke of each piston.

In the process, first, at a step S80, similarly to the step S70, a coolant temperature-dependent correction term IJTW is determined by retrieval from the FIG. 13 TW-IJTW table according to the engine coolant temperature TW.

Then, the program proceeds to a step S81, wherein it is determined whether or not the EGR-permitting flag F_EGR assumes "1". If the answer to the question is affirmative (YES), i.e. if EGR operation is being carried out, the program proceeds to a step S82, wherein a basic injection termination timing INJMAPF for EGR operation is determined by retrieval from a map, not shown, according to the engine rotational speed NE and the final fuel injection time period Tout(i) for each cylinder, on a cylinder-by-cylinder basis.

Then, the program proceeds to a step S83, and the injection termination timing IJLOGH is set to a value obtained by adding the coolant temperature-dependent correction term IJTW calculated at the step S80 to the basic injection termination timing INJMAPF for each cylinder, followed by terminating the program. Thus, the injection termination timing IJLOGH for EGR operation is obtained for each cylinder.

On the other hand, if the answer to the question of the step S81 is negative (NO), i.e. if EGR operation is not being carried out, the program proceeds to a step S84, wherein a basic injection termination timing INJMAPF for NON-EGR operation is determined by retrieval from a map, not shown, similarly to the step S82, according to the engine rotational speed NE and the final fuel injection time period Tout (i) for each cylinder, on a cylinder-by-cylinder basis. Then, at the step S83, an injection termination timing IJLOGH for NON-EGR operation is obtained for each cylinder, followed by terminating the program.

Figure 15:
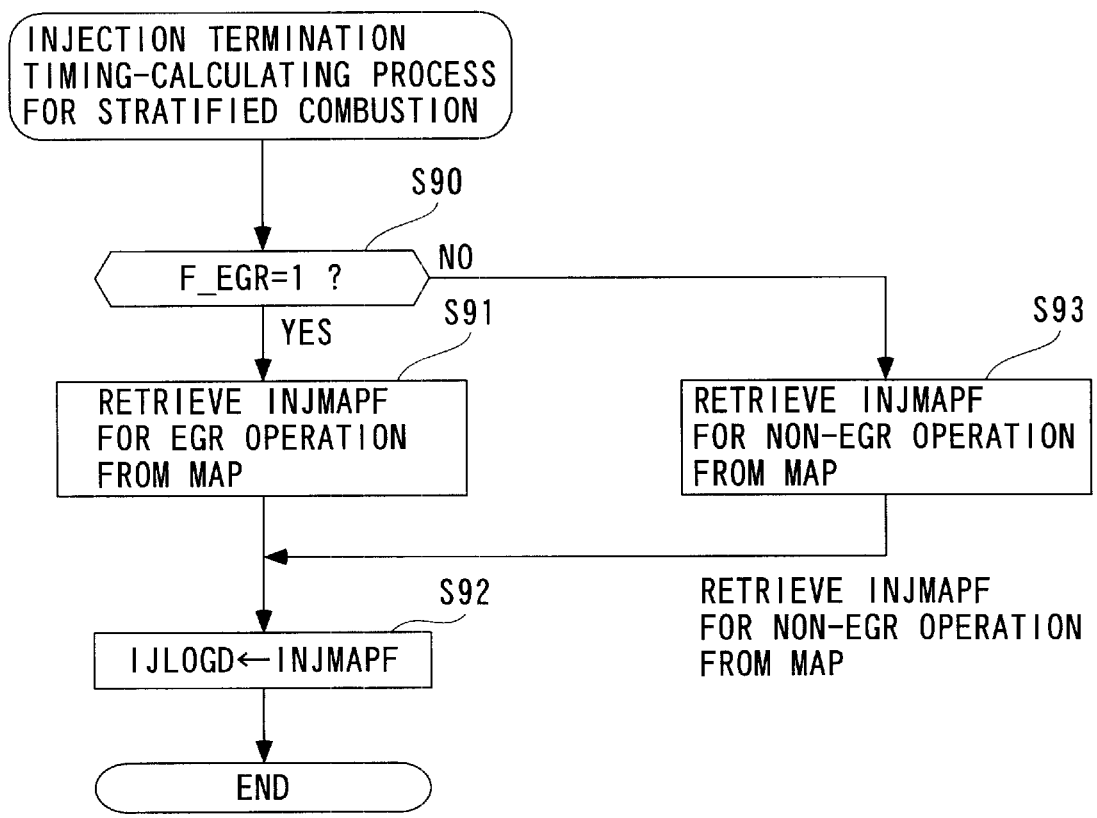
FIG. 15 is a flowchart showing a subroutine for carrying out an injection termination timing-calculating process for stratified combustion in FIG. 10.

Next, the injection termination timing-calculating process for stratified combustion, which is executed at the step S65, will be described with reference to FIG. 15. In the process, differently from the injection termination timing for stoichiometric combustion or for lean combustion, the injection termination timing IJLOGH is calculated as a crank angle position after TDC of a compression stroke of each piston.

In the process, first, it is determined at a step S90 whether or not the EGR-permitting flag F_EGR assumes "1". If the answer to the question is affirmative (YES), i.e. if EGR operation is being carried out, the program proceeds to a step S91, wherein a basic injection termination timing INJMAPF for EGR operation is determined by retrieval from a map, not shown, according to the engine rotational speed NE and the final fuel injection time period Tout(i) for each cylinder, on a cylinder-by-cylinder basis.

Then, the program proceeds to a step S92, wherein the injection termination timing IJLOGH is set to the basic injection termination timing INJMAPF for each cylinder, followed by terminating the program.

On the other hand, if the answer to the question of the step S90 is negative (NO), i.e. if EGR operation is not being carried out, the program proceeds to a step S93, wherein a basic injection termination timing INJMAPF for NON-EGR operation is determined by retrieval from a map, not shown, similarly to the step S91, according to the engine rotational speed NE and the final fuel injection time period Tout (i) for each cylinder, on a cylinder-by-cylinder basis. Then, at the step S92, an injection termination timing IJLOGH for NON-EGR operation is obtained for each cylinder, followed by terminating the program.

As described above, according to the fuel injection control system 1 of the present embodiment, the required fuel injection time period Tcyl is calculated by multiplying the basic fuel injection time period Timap by the total correction coefficient Ktotal, the desired air-fuel ratio correction coefficient KCMD, and the feedback correction coefficient KSTR, and further, the required fuel injection time period Tcyl is corrected by using the deposited-fuel amount-equivalent value TWP, the direct ratio AE, and the carry-off ratio Be, to calculate the final fuel injection amount Tout. Then, the fuel injection timing $\theta$inj is determined based on the final fuel injection time period Tout and the engine rotational speed NE. As described above, since the fuel injection timing $\theta$inj is properly determined based on the final fuel injection time period Tout corrected by the direct ratio Ae and the carry-off ratio Be related to the deposition of fuel to the inner walls of the combustion chamber, differently from the prior art, the fuel injection timing $\theta$inj can be properly calculated such that the fuel injection timing $\theta$inj reflects the behaviors of fuel related to the deposition of fuel. This can enhance the drivability and fuel economy.

Further, particularly in the case of an internal combustion engine of in-cylinder injection type as in the present embodiment, in which the injector 4 is disposed substantially in the center of a top wall of the combustion chamber 3c, and fuel jets are formed by causing fuel injected from the injector 4 to hit against the top surface of the piston 3a, such that the fuel jets and a flow of air taken in from the intake pipe 9 form an air-fuel mixture, it has been confirmed by experiment that the air-fuel mixture is more excellently formed in the stratified combustion mode when the fuel injection timing $\theta$inj is determined from the final fuel injection time period Tout, though data of the experiment is not shown here.

Further, in the homogenous combustion mode, the injection termination timing IJLOGH of the fuel injection timing $\theta$inj is determined by adding the coolant temperature-dependent correction term IJTW to the basic fuel injection termination timing INJMAP, and in the stratified combustion mode, the basic fuel injection termination timing INJMAP is directly set to the fuel injection termination timing JLOGD without adding the coolant temperature-dependent correction term IJTW thereto. Therefore, during the homogenous combustion mode, if the piston is cold due to a low engine temperature, by advancing the fuel injection timing, atomization of fuel can be promoted in view of a high tendency for forming unatomized fuel droplets when the distance between an injector from which fuel is injected and the piston is large, whereby it is possible to ensure excellent combustion of fuel.

Although in the above embodiment, to calculate the final fuel injection time period Tout, the direct ratio Ae and the carry-off ratio Be are determined as the parameters indicative of behaviors of fuel, and the required fuel injection time period Tcyl is corrected by using these parameters, the parameters indicative of behaviors of fuel are not limited to these, but the amount of purge during purge of evaporative fuel, or a parameter indicative of this amount may be used.

It is further understood by those skilled in the art that the foregoing is a preferred embodiment of the invention, and that various changes and modifications may be made without departing from the spirit and scope thereof.

What is claimed is:

1. A fuel injection control system for an internal combustion engine of an in-cylinder fuel injection type which is operated while switching between a stratified combustion mode in which fuel injection into each cylinder is performed during a compression stroke and a homogenous combustion mode in which said fuel injection into said cylinder is performed during an intake stroke, the fuel injection control system controlling timing of the fuel injection, the fuel injection control system comprising:

operating condition-detecting means for detecting operating conditions of said engine;

required fuel amount-determining means for determining a required fuel amount based on the detected operating conditions of said engine;

parameter-calculating means for calculating parameters indicative of behaviors of said fuel based on the detected operating conditions of said engine;

fuel injection amount-determining means for determining a final fuel injection amount by correcting said required fuel amount by using the calculated parameters;

engine rotational speed-detecting means for detecting an engine rotational speed of said engine; and fuel injection timing-determining means for determining said fuel injection timing based on the detected engine rotational speed and the determined final fuel injection amount.

2. A fuel injection control system according to claim 1, further including:

engine temperature-detecting means for detecting a temperature of said engine; and fuel injection timing-correcting means for correcting said fuel injection timing according to the detected temperature of said engine, during said homogenous combustion mode.

3. A fuel injection control system according to claim 1, wherein said operating condition-detecting means includes fuel pressure-detecting means for detecting a fuel pressure of fuel to be injected into said cylinder, and wherein said fuel injection amount-determining means includes fuel injection amount-correcting means for correcting said final fuel injection amount according to the detected fuel pressure.

4. A fuel injection control system according to claim 1, wherein said operating condition-detecting means includes fuel pressure-detecting means for detecting a fuel pressure of fuel to be injected into said cylinder, and wherein said parameter-calculating means includes parameter-correcting means for correcting said parameters according to the detected fuel pressure.

5. A fuel injection control system according to claim 1, wherein said fuel injection timing-determining means determines start timing of said fuel injection by calculating back said start timing from termination timing of said fuel injection calculated based on the detected engine rotational speed, by using a time period corresponding to said final fuel injection amount.

6. A fuel injection control system according to claim 1, wherein said parameters indicative of behaviors of fuel are a ratio of an amount of part of injected fuel which is injected in the present combustion cycle, said part of said injected fuel being actually burned in the present combustion cycle, to an amount of said injected fuel, and a ratio of an amount of part of deposited fuel which was left deposited on inner walls of a combustion chamber defined within said cylinder at an end of the immediately preceding combustion cycle, said part of said deposited fuel being actually burned in the present combustion cycle, to an amount of said deposited fuel.

* * * * *